No. 626,218. Patented June 6, 1899.
H. B. BROWNELL.
INKSTAND.
(Application filed Dec. 22, 1896. Renewed Feb. 27, 1899.)
(No Model.)
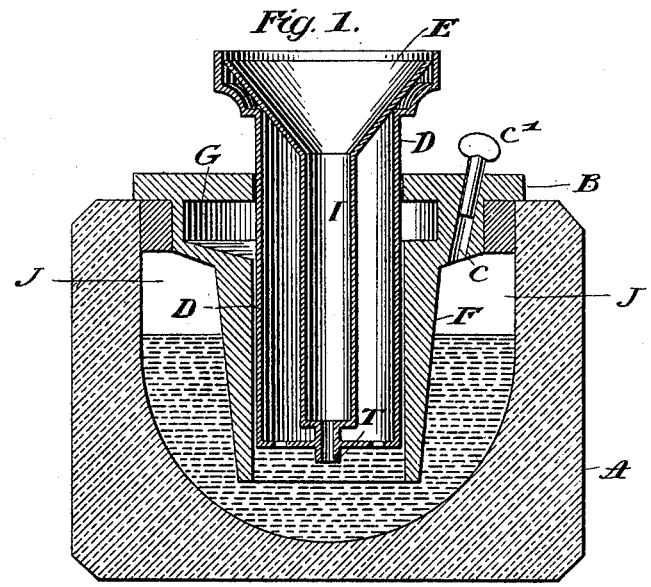
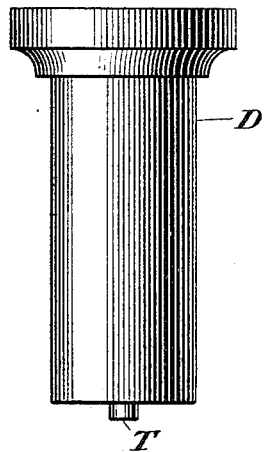
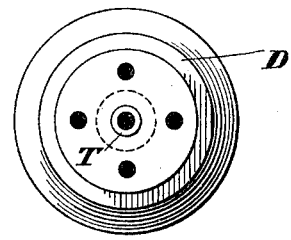
WITNESSES:
Frank S. Ober
H. W. Skinner
INVENTOR:
Henry B. Brownell.
BY
[signature]
ATTORNEY
THE NORRIS PETERS CO., PHOTO-LITHO., WASHINGTON, D. C.

UNITED STATES PATENT OFFICE.

HENRY B. BROWNELL, OF NEW YORK, N. Y., ASSIGNOR TO EMRY DAVIS, OF SAME PLACE.

INKSTAND.

SPECIFICATION forming part of Letters Patent No. 626,218, dated June 6, 1899.

Application filed December 22, 1896. Renewed February 27, 1899. Serial No. 707,091. (No model.)

*To all whom it may concern:*

Be it known that I, HENRY B. BROWNELL, of the city of New York, county and State of New York, have invented a certain new and useful Improvement in Inkstands, of which the following is a specification.

My improvement relates to inkstands of the general class in which the ink rises to the pen by reason of displacement of the ink in the stand due directly to the depression of a displacing-body, and has for its object to simply and efficiently provide a means for the regulation of the supply of ink.

The following is a description of my invention, reference being had to the accompanying drawings, in which—

Figure 1 is a sectional view of a stand embodying my improvement. Fig. 2 is a side elevation of the displacing-body. Fig. 3 is a view of the bottom of the displacing-body.

In the stand shown in the drawings, A is the ink-well. B is a cover fitting the mouth of the well, making an air-tight joint. This cover has a circular depending flange F. It also has an orifice C, closed by a plug C'. Within the circular depending flange F, the inner wall of which is perpendicular, is the displacing-body, which is in this case a hollow float D or may be described as a "floating dipping cup" which has a cup-shaped recess E and a central bore I. The float D fits the opening within the wall of the flange F. In the upper part of the cover there is a recess G to retain any ink that may be forced up between the float D and the flange F, so as to prevent it from getting to the top of the cover.

The above construction particularly described is substantially old in the art. In this old stand as the float D is depressed by the pen the ink rises to the pen and when the pen is removed the float rises and the ink disappears. When, however, by use or evaporation the level of the ink in the well falls so that pressure upon the float does not result in sufficient displacement to bring ink to the pen, it is necessary that the plug C' be removed by one hand and the float D raised to the desired height by the other and that the plug C' be then reinserted while the float is thus elevated. By this means air is admitted above the ink in the air-chamber J, and the level of the ink below the float rises sufficiently to make the ink come to the pen when the float is depressed. It is evident that this manner of admitting air to the chamber is inconvenient and uncertain and that it is liable to stain the fingers and stand. My improvement is a means whereby all this manipulation is avoided, and as shown herein consists in the addition of the small projecting tube T, which extends a short distance below the flat end of the float. This does not affect the normal operation of the stand so far as concerns the rising of the ink as the pen is pressed upon the float. When, however, the ink evaporates or is used up so that it no longer rises as the float is depressed and it becomes necessary to introduce air into the air-chamber, this can be done by simply raising the float entirely above the surface of the ink by the point of the pen or by a finger and then depressing it. Upon raising it air flows through the bore I and is retained in the space between the inner walls of the flange F and the tube T. As the float is depressed this air is forced below the flange F and flows to the air-chamber J, formed between the flange F and the wall of the well, so that by this simple operation air is introduced into the chamber and the same result obtained as by the other cumbersome method above described. The air is pumped in, and the amount introduced varies as the length of the tube or the number of times the float is raised above the ink and depressed, as described.

Having thus described my invention, what I claim is—

1. In an inkstand an external wall and an internal depending wall forming a closed air-chamber substantially as described, in combination with a displacing-body within and fitting said inner wall, carrying the dipping cup, and having a projection at the bottom of said displacing-body completely surrounding the opening of the passage leading to said cup, substantially as described.

2. In an inkstand, an external wall and an internal depending wall forming a closed air-chamber, said internal wall having a circular opening, a float fitting within said opening, and provided with a cup and passage leading thereto, and a projection at the bottom of said float surrounding the opening of the passage leading to the cup and extending below the bottom of the internal wall, when said float is depressed, substantially as described.

HENRY B. BROWNELL.

Witnesses:
H. M. SKINNER,
C. B. EATON.